United States Patent
Guilley et al.

(10) Patent No.: US 10,630,492 B2
(45) Date of Patent: Apr. 21, 2020

(54) DEVICE AND METHOD FOR TESTING A PHYSICALLY UNCLONABLE FUNCTION

(71) Applicant: SECURE-IC SAS, Cesson-Sévigné (FR)

(72) Inventors: Sylvain Guilley, Paris (FR); Jean-Luc Danger, Antony (FR); Philippe Nguyen, Rennes (FR)

(73) Assignee: SECURE-IC SAS, Cesson-Sévigné (FR)

( * ) Notice: Subject to any disclaimer, the term of this patent is extended or adjusted under 35 U.S.C. 154(b) by 0 days.

(21) Appl. No.: 15/480,729

(22) Filed: Apr. 6, 2017

(65) Prior Publication Data

US 2017/0295026 A1    Oct. 12, 2017

(30) Foreign Application Priority Data

Apr. 8, 2016  (EP) .................... 16305419

(51) Int. Cl.
*H04L 9/32* (2006.01)
*G09C 1/00* (2006.01)
*G06F 11/263* (2006.01)

(52) U.S. Cl.
CPC .......... *H04L 9/3278* (2013.01); *G06F 11/263* (2013.01); *G09C 1/00* (2013.01); *H04L 2209/12* (2013.01); *H04L 2209/26* (2013.01)

(58) Field of Classification Search
CPC ............. H04L 9/3278; H04L 2209/26; H04L 2209/12; G06F 11/263; G06F 21/577; G09C 1/00
See application file for complete search history.

(56) References Cited

U.S. PATENT DOCUMENTS 9,279,850 B1 *   3/2016   Pedersen .............. H03K 19/003
9,584,329 B1 *   2/2017   Trimberger ........... H04L 9/3278
(Continued)

FOREIGN PATENT DOCUMENTS

FR        2955394 A1       7/2011
WO   20070069190 A2       6/2007

OTHER PUBLICATIONS

Tajik et al., Physical Characterization of Arbiter PUFs, 18 pages (Year: 2014).*

(Continued)

*Primary Examiner* — Huan V Doan
(74) *Attorney, Agent, or Firm* — Meagher Emanuel Laks Goldberg & Liao, LLP

(57) ABSTRACT

There is provided a method for testing a Physically Unclonable Function (PUF) implemented in a device, said PUF being configured to receive at least one challenge, each challenge comprising a set of bits, and to produce a set of responses, each response comprising at least one bit and corresponding to one challenge, said PUF comprising a circuitry including a set of PUF elements, each PUF element being controlled by at least one input bit corresponding to at least one bit of said challenge, wherein the method comprises the steps of:

applying at least one bit of the challenge to the PUF instance;

determining (300) identifiers for at least some of the PUF elements, the identifier of each PUF element being determined from the response output by said PUF element in response to said at least one bit of the challenge;

applying a statistical randomness test (304) to a group of identifiers comprising at least some of the identifiers determined for said PUF elements, which provides a test indicator; and testing said PUF based on said test indicator.

18 Claims, 8 Drawing Sheets

(56) References Cited

U.S. PATENT DOCUMENTS

| | | | | |
|---|---|---|---|---|
| 2009/0083833 | A1* | 3/2009 | Ziola | G06F 21/31 |
| | | | | 726/2 |
| 2011/0055649 | A1 | 3/2011 | Koushanfar et al. | |
| 2011/0317829 | A1* | 12/2011 | Ficke | H04L 9/3278 |
| | | | | 380/46 |
| 2015/0278527 | A1* | 10/2015 | Falk | G09C 1/00 |
| | | | | 726/25 |
| 2017/0077046 | A1* | 3/2017 | Gupta | H01L 27/0207 |

OTHER PUBLICATIONS

Pappu et. al. in "Physical One-Way Functions", MIT, Mar. 2001.
Yohei Hori, Takahiro Yoshida, Toshihiro Katashita and Akashi Satoh, in "Quantitative and Statistical Performance Evaluation of Arbiter Physical Unclonable Functions on FPGAs", International Conference on Reconfigurable Computing and FPGAs, IEEE, 2010, pp. 298-303.
Dlivier Rioul, Patrick Solé, Sylvain Guilley and Jean-Luc Danger, in "On the Entropy of Physically Unclonable Functions" at 2016 IEEE International Symposium on Information Theory.
Abhranil Maiti, Vikash Gunreddy, and Patrick Schaumont, "A systematic method to evaluate and compare the performance of physical Unclonable functions", IACR ePrint, vol. 657, pp. 245-267, 2013.
J. M. Maurer, "A Universal Statistical Test for Random Bit Generators", Journal of Cryptology, vol. 5, No. 2, pp. 89-105, 1992.
European Search Report for 16305419.0 dated Nov. 3, 2016.
Zouha Cherif et al: "Modelling and characterization of physically uncloneable functions", Apr. 8, 2014 (Apr. 8, 2014), Retrieved from the Internet: URL:https://hal.archives-ouvertes.fr/hal-0753222/ document.
Zouha Cherif et al:Physically Unclonable Function: Principle, Design and Characterization of the Loop PUF, Nov. 3, 2014 (Nov. 3, 2014), Trusted Computing for Embedded Systems, Springer, pp. 115-131.
Majzoobi M et al: "Testing Techniques for Hardware Security" Test Conference, 2008, ITC 2008, IEEE International, IEEE, Piscataway, NJ, USA, Oct. 28, 2008 (Oct. 28, 2008), pp. 1-10.
Maiti Abhranil et al: "The Impact of Aging on a Physical Unclonable Function", IEEE Transactions on Very Large Scale Integration (VLSI) Systems, IEEE Service Center, Piscataway, NJ, USA, vol. 22, No. 9, Sep. 1, 2014 (Sep. 1, 2014), pp. 1854-1864.

* cited by examiner

DEVICE AND METHOD FOR TESTING A PHYSICALLY UNCLONABLE FUNCTION

TECHNICAL FIELD

The invention generally relates to the field of data and device securing, and in particular to methods and devices for testing a physical Unclonable function implemented in a device.

BACKGROUND

Integrated circuits generally contain secret data such as security keys and secret functions. However, different types of attacks can be implemented against integrated circuits from the outside to try to access such data, such as side-channel attacks, electro-migration (such as power consumption, electromagnetic emissions, operations duration, etc.), imaging, fault injection, etc.

To counteract such attacks, solutions based on tamper protection schemes combined with cryptography were proposed, such as Physical unclonable Functions (PUFs), as disclosed in Pappu et. al. in "Physical One-Way Functions", MIT, March 2001. A PUF is a physical entity which is embodied in a physical structure which is the same in each physical instantiation of the physical entity and which generates a specific output when provided with an input. The value of the specific output is specific to each instantiation of the physical entity embodied within a device. In addition to be tamper-proof in nature, a PUF thus also ensures that the PUF value knowledge of one device does not jeopardize all fabricated devices.

A PUF takes advantage of the variance of conditions in the manufacturing process of many identical devices. A PUF can be incorporated in a CMOS integrated circuit. To some extent, a PUF may be considered as the analog of a fingerprint of the device. A PUF can be used in various contexts (e.g. authentication of chips or goods it is attached to, generation of cryptographic keys or seeds of PRNG, etc).

The physical structure that contains the PUF consists of at least one random component. The output of PUF for a given input is obtained by submitting the input to the physical system in the form of a stimulus, and mapping the behavior that occurs as a result of an interaction between the stimulus and the physical system to an output.

PUFs inherently possess tamper resistant properties. If an attacker tries to disassemble the PUF to observe its operation, this will also disturb the random elements of the PUF and the mapping between the inputs and the outputs. The knowledge of the PUF structure obtained by reverse engineering does not unveil the PUF value.

The value of an output of a PUF for a given challenge is specific to each physical instantiation embodied within a device. A PUF reflects the condition changes in the manufacturing process of otherwise identical structures.

Conventional PUFs include "silicon PUFs" which are fabricated in the same material and through the same process as electronic circuits. This allows embedding PUFs very close to parts of the circuit which process and transmit information. Silicon PUFs are located very close to the cryptographic modules and are thus difficult to tamper with.

Some PUFs, known as "strong" PUFs, have an input and reply differently for each input. Most silicon PUFs are well suited to be strong, since it can have the necessary logic to present the input to the PUF as it awaits it.

An input that a strong PUF accepts is generally referred to as a "challenge" or challenge signal. A challenge is represented by a vector of bits. The output of a PUF is generally referred to as a "response" or "response signal". A PUF is thus a physical function which maps a digital "Challenge" to a digital "Response". A response to a given reference challenge is also referred to as an "identifier". A pair comprising a challenge and the corresponding response of a PUF is referred to as a challenge-response pair.

The interaction between a given challenge and the physical system embodying the PUF cannot be predicted without access to the system. Accordingly, a PUF is hard to characterize. It is unfeasible to obtain the response of a particular PUF for a given challenge without access to the particular physical system underlying the particular PUF. A PUF thus implements a set of challenge-response pairs (CRPs) such that separate logically-identical devices produce different CRPs, unpredictable even to the designer. In other words, a challenge-response pair CRP is coupled to a unique physical device (hence, the "unclonable" property of a PUF). As a result, PUF functions allow identification of objects using their intrinsic physical properties.

A PUF determines an associated response value for a predefined challenge value on the basis of the physical properties of the object. To authenticate an object (i.e. identify the object as the original object), one approach consists in comparing the similarity of the available response values for given challenges, if challenge-response pairs CRPs are known, and the response values provided by the object to be authenticated for these challenges. PUFs can be also used for on-chip determination of a cryptographic key, or for generating a unique identifier such as a cryptographic key for cryptographic purposes.

When handling PUFs, it may be required to assess or test the quality of the PUF devices. The quality of a PUF device may be related to a number of properties or metrics such as:

Steadiness/Reliability: it refers to the property that a response for a given input is replied in a deterministic manner. This property is not only a safety property. Indeed it is also a security issue as an unreliable PUF can accidentally provide the output of another PUF;

Randomness/Unpredictability: it refers to the property that PUFs responses are not predictable, as would be with a serial number, incremented for each device;

Uniqueness: it refers to the property that instances of PUFs differ;

Diffuseness: it refers to the property that the PUF's response to a challenge is unrelated to the challenge, e.g., it is hard to infer an answer from a set of known challenge response pairs. This property concerns specifically "strong PUFs".

Such properties have been analyzed in Yohei Hori, Takahiro Yoshida, Toshihiro Katashita and Akashi Satoh, in "Quantitative and Statistical Performance Evaluation of Arbiter Physical Unclonable Functions on FPGAs", International Conference on Reconfigurable Computing and FPGAs, IEEE, 2010, pp. 298-303.

It is paramount to test these metrics representative of the quality of a PUF both to ensure that the PUF is operational and that it can be used securely. Indeed, if by some means (natural or adversarial), an attacker is able to change the result of a PUF, he/she might succeed in impersonating a device or even in choosing its secret key.

There exist two kinds of tests to assess the quality of a PUF:

1. a test on the abstract model of the PUF, which gives a guarantee that the PUF rationale is sound (Olivier Rioul, Patrick Sol, Sylvain Guilley and Jean-Luc Danger, in "On the Entropy of Physically Unclonable Functions" at 2016 IEEE International Symposium on Information Theory), 2. a test on one concrete instance of the PUF.

The second type of test is of major importance because:

the abstract model might not match the reality so that the first test may be worthless, and an adversary can have changed the PUF via several attacks (for example by destroying it, cutting an essential wire such as a single point of failure, intentionally accelerating its aging, etc.)

Most of existing tests on PUF have limitations because they are not carried out as online and embedded tests. An "Online" test refers to a test carried out in the field, on the final product using the PUF. An "Embedded" test refers to a test that is computable on the PUF without external connection (which would otherwise be considered a "backdoor").

There exist on-line and embedded testing of "steadiness/reliability" and "diffuseness". However, the randomness, unpredictability and uniqueness properties of a PUF are impossible to assess with an embedded test. Indeed, these metrics do not concern a PUF instantiation individually but a "batch of PUFs". In particular, a major challenge of PUFs relates to test of uniqueness. It is hard to assess the uniqueness of a PUF if the value of the other PUFs of the batch are not known. The uniqueness of a PUF may be defined as the independence among multiple PUFs of responses to the same challenge. The responses from PUFs need to have extremely high uniqueness in order to prevent clones of cryptographic hardware. To warranty uniqueness, manufacturers have to make sure that multiple PUFs with the same challenge-response pairs do not exist, which is costly because each PUF relates to a same PUF batch comprising a huge number of manufactured PUFs and challenge-response pairs.

A PUF is implemented from a unique model and should be manufactured such as every instance of a PUF is different after fabrication. Each instance of a PUF features a behavior which is very little correlated with the other instances of the PUF belonging to a same batch. A small correlation can exist for PUFs which are fabricated close one to each other, but the correlation decreases with the distance. This is due to the working factor of PUFs. Indeed, PUFs rely on small technological variations between instances, which are responsible for the unique behavior of each instance.

Such technological variations are:

independent (e.g., due to the inhomogeneous doping of transistors), and correlated (e.g., due to surface effects, a part of the wafer where PUFs are implanted can be more doped than another one further apart).

However, the typical distance of correlation is of the order of a few microns at most and the typical size of a PUF instance is rather of the order of several microns, even in very deep submicron CMOS processes.

Existing approach to assess uniqueness of a PUF are based on querying the identifiers generated by the PUFs of a given batch of PUFs, and to compute the entropy of the identifier (a high entropy meaning a good randomness) and the number of collisions among the identifiers (the fewest collisions, the better the uniqueness). In existing approaches, the estimation of parameters that concern batches of PUFs consists in requesting the responses (e.g., unique identifier) of many or all of PUF instances of a same batch of PUF. Then, based on such database of identifiers, it is possible to test uniqueness and randomness. These properties are called "batch properties". For example, such approaches are described in:

Yohei Hori, Takahiro Yoshida, Toshihiro Katashita and Akashi Satoh, Quantitative and Statistical Performance Evaluation of Arbiter Physical Unclonable Functions on FPGAs, International Conference on Reconfigurable Computing and FPGAs, 2010, pp. 298-303, and Abhranil Maiti, Vikash Gunreddy, and Patrick Schaumont, A systematic method to evaluate and compare the performance of physical Unclonable functions, IACR ePrint, vol. 657, pp. 245-267, 2013.

Such methods are extremely costly and sometimes impossible to carry out.

The measurement of batch properties (randomness and uniqueness) can be needed at various times in the lifecycle of products such as for example:

just after manufacturing;

at boot of the product in the field;

before the PUF is requested (that is, challenged at least once; and/or sporadically, to check whether no harm or no attack has been perpetrated on the PUF.

After manufacturing, it is possible to request a PUF response, but this may cause delay in the production line, hence incurring extra costs. Besides, it is possible that a same PUF be used in different products, while the products embedding the PUF are manufactured at different places. Such heterogeneity does not ease the collection of PUF identifiers. In such situations, instead of testing the "batch properties" on all instances of a PUF, the test is conducted on a representative pool of the PUF batch. In most operational environments, the estimation of "batch properties" is practically difficult to realize. For instance, the PUFs can be dispatched in many different devices, which might not all be reachable easily, and at all time. Besides, it is considered a security issue for PUF to disclose its responses. Therefore, it is required that PUFs batch properties can be tested in situ.

There is accordingly a need for online and embedded tests capable of efficiently testing the randomness and uniqueness of a PUF.

SUMMARY

In order to address these and other problems, there is provided a method for testing a Physically Unclonable Function (PUF) implemented in a device, the PUF being configured to receive at least one challenge, each challenge comprising a set of bits, and to produce a set of responses, each response comprising at least one bit and corresponding to one challenge, the PUF comprising a circuitry including a set of PUF elements, each PUF element being controlled by at least one input bit corresponding to at least one bit of the challenge. The method may comprise the steps of:

applying at least one bit of the challenge to the PUF instance;

determining identifiers for at least some of the PUF elements, the identifier of each PUF element being determined from the response output by the PUF element in response to the at least one bit of the challenge;

applying a statistical randomness test to a group of identifiers comprising at least some of the identifiers determined for the PUF elements, which provides a test indicator; and testing the PUF based on the test indicator.

In certain embodiments, the PUF may comprise at least one auxiliary component arranged in the PUF to read the output of each PUF element, and the step of determining the identifiers of the PUF elements may comprise reading the output of the at least some PUF elements, according to a reading protocol.

The reading protocol is chosen in a group may consist of a sequential reading protocol and a parallel reading protocol.

In some embodiments, the step of determining the identifier of each PUF element may comprise:
- iteratively applying a set of challenges and reading the response output by the PUF element in response to each challenge;
- determining the identifier of the PUF identifier from the responses.

The response output by the PUF element may comprise at least one bit, and the step of determining the identifier of the PUF identifier from the responses may comprise aggregating at least some of the responses read for the set of challenges.

In some embodiments, the method may further comprise storing the responses read at the output of each PUF element in a data structure.

In one application of the invention, the PUF is an arbiter-PUF comprising a set of PUF elements, each PUF element being a delay element comprising paired components, each paired component comprising at least one switching unit having a main input for receiving a signal, the paired components sharing a control input receiving the at least one bit of the challenge associated with the PUF element, the paired components of the arbiter-PUF defining two logic paths in response to a challenge, the PUF further comprising a main arbiter unit at the end of the logic paths for comparing the analog timing difference between the two logic paths and producing a digital output dependent upon the timing differences. The auxiliary components may further comprise at least one auxiliary arbiter unit for generating a bit value by determining which signal is faster between the two signals output at the paired components of each PUF element, the response at the output of the PUF element being equal to the bit value.

The at least one auxiliary arbiter unit may comprise the main arbiter unit and a selector configured to select the outputs of the paired components of a chosen PUF element and transmit the outputs to the arbiter unit in a test mode.

The selector may be controlled by an index bit, the index bit having a value representing the index of the chosen PUF element.

The at least one auxiliary arbiter unit may comprise a set of elementary arbitrating units, each elementary arbitrating unit arranged at the output of a PUF element being configured to receive the outputs of the paired components of the PUF element in a test mode and generate the bit value.

The method may further comprise detecting errors generated during the step of acquiring the identifiers of the PUF elements and correcting the errors.

The PUF being an instance of a given batch, the method may further comprise determining the identifiers of neighboring PUF elements of one or more PUF instances of the PUF batch located in the vicinity of the PUF in the device, the group of PUF further comprising the identifiers of the neighboring PUF elements.

The identifiers of neighboring PUF elements may be transmitted to the PUF instance according to a Diffie-Hellman protocol.

In some embodiments, the at least one statistical randomness test may be chosen in a group consisting of an entropy test and a Maurer test.

The test indicator may be assigned to a first value if it is detected in the step of applying a statistical randomness test that at least one PUF identifier is redundant within the group of PUF element identifiers, the method further comprising a step of triggering an action in response to the test indicator being assigned the first value.

In particular, the action may be chosen in a group consisting of a revocation of the PUF, a disablement of the PUF, an emission of a notification, or an emission of an alert message.

There is further provided a computer program comprising instructions for carrying out the steps of the method according to any previous features, when the computer program is executed on a suitable computer device.

There is also provided a testing device for testing a Physically Unclonable Function (PUF) implemented in a device, the PUF being configured to receive at least one challenge, each challenge comprising a set of bits, and to produce a set of responses, each response comprising at least one bit and corresponding to one challenge, the PUF comprising a circuitry including a set of PUF elements, each PUF element being controlled by at least one input bit corresponding to at least one bit of the challenge, the testing device being configured to apply at least one bit of the challenge to the PUF instance. The testing device comprises:
- an identifier acquisition unit configured to determine identifiers for at least some of the PUF elements, the identifier of each PUF element being determined from the response output by the PUF element in response to the at least one bit of the challenge;
- a test application unit configured to apply a statistical randomness test to a group of identifiers comprising at least some of the identifiers determined for the PUF elements, which provides a test indicator;
- the testing device being configured to test the PUF based on the test indicator.

Embodiments of the invention allows for testing uniqueness and randomness of a PUF without a need to test all the PUF instances of the PUF batch from which the PUF originates.

BRIEF DESCRIPTION OF DRAWINGS

Embodiments of the present invention will now be described by way of example with reference to the accompanying drawings in which like references denote similar elements, and in which.

DETAILED DESCRIPTION

There is provided a method and a system for testing uniqueness and randomness of a PUF instance (also referred to as a PUF "instantiation"), embedded on a device, the PUF instance belonging to a given batch of PUFs, which obviates the need for testing the other PUF instances of the batch.

Figure 1:
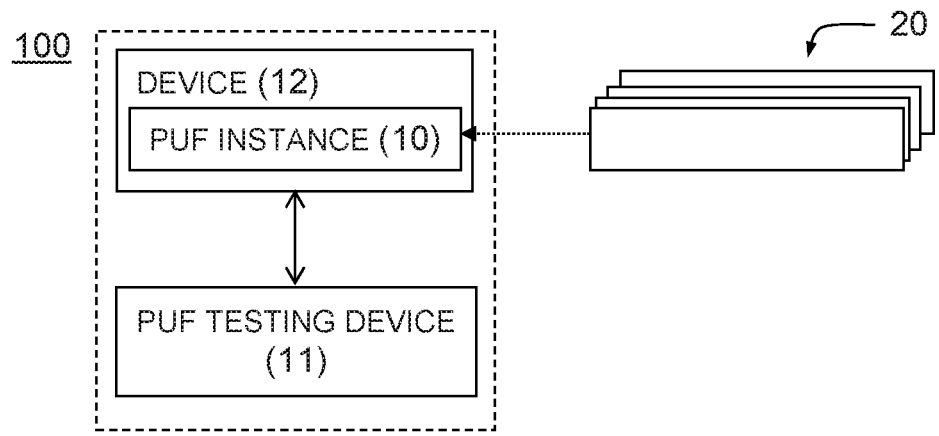
FIG. 1 represents a system for testing the uniqueness of a PUF instance.

FIG. 1 represents a system 100 for testing the uniqueness of a PUF instance 10. The PUF instance is embedded in a device 12, such as an integrated circuit. The system 100 comprises a testing device 11 for testing the uniqueness of the PUF instance belonging to a PUF batch 20 comprising a set of PUF instances, without a need to access all the PUF instances of the batch.

The device 12 may comprise one or more PUF instances, including other PUF instances belonging to the same batch 20 as the PUF instance being tested. The other PUF instances embedded in the device 12 and belonging to the same batch will be referred to hereinafter as "neighboring" PUF instances.

Each PUF instance 10 to be tested by the testing system 100 is configured to produce a measurable output when queried with a certain input. It should be noted that a PUF as such is not a "function" in the mathematical sense. Indeed, an input to a PUF may have more than one possible output. However, the number of possible answers to a given challenge is limited and is desirably equal to only one for a PUF of fair enough reliability. A PUF rather designates a process performed by or acting upon a particular (physical) system.

An input applied to the PUF 10 is referred to as a "challenge". The output produced by the PUF 10 is referred to as "a response". The pair formed by an applied challenge and the corresponding measured response is referred to as a challenge-response pair or "CRP". The relation between challenges and responses generated by a particular PUF 10 is referred to as the CRP behavior of the PUF.

The PUF 10 may be operated according to two phases:
In the first phase, called "enrollment", a number of CRPs may be gathered from the PUF 10 and stored in a so-called CRP database;
In a second phase, also called "verification" phase, a challenge from the CRP database may be applied to the PUF 10 and the response produced by the PUF may be compared with the corresponding response from the database.

The challenges applied to the PUF 10 and the responses obtained as the result of the application of the challenge may comprise bit strings. In some embodiments, decoding and quantization steps may be applied to apply analog physical stimuli as challenges and derive the response from measures of the analog effects thus obtained.

A same challenge applied to the PUF 10 does not necessarily produce the same response, giving rise to an intra-distance between the PUF responses. This may result from random noise, environmental factors (e.g. temperature or supply voltage in case of a PUF on an integrated circuit).

Embodiments of the invention can be applied to any type of PUF such as:
PUF constructions consisting of electrical and/or electronic building blocks whose response generation is mainly based on analog measurements (LC PUFs, Coating PUFs, . . . ).
Digital intrinsic PUFs which are embedded on an integrated circuit (IC) device 12 (also called "silicon-PUFs") and which are based on building blocks formed by regular digital primitives for the considered manufacturing technology. The construction of intrinsic PUFs is based on primitives which are available for the manufacturing process of the embedding device. Further, the device 12 embedding an intrinsic PUF can query and read-out the PUF without the need for external instruments and without the need for the challenge and response to leave the device. Intrinsic PUFs comprise delay-based PUFs (also referred to hereinafter as "delay PUFs") which are based on delay measurements (such as Arbiter PUFs, Ring Oscillator PUFs or RO PUFs, Loop PUF, etc.) and Memory-based Intrinsic PUFs (also referred to hereinafter as "memory PUFs") which are based on the settling state of memory elements (SRAM PUFs, butterfly PUFs, etc. . . . ).

A delay PUF is a PUF that accepts many challenges. For example, in a delay PUF, the delay is controlled by the challenge bits thus providing a huge number of challenge combinations. Hence delay PUFs comprise PUFs such as Arbiter PUFs RO-PUFs or Loop PUF.

A memory PUF is associated with a limited number of different challenges. For example a memory PUF can be a SRAM PUF. In such a case, the memory addresses can be used as challenges.

In certain embodiments, the invention may also be applied to a so-called "composite" PUF or a combination of several memory PUFs.

The PUF 10 may belong to the category of "weak" PUFs or "strong" PUFs.

A "weak" PUFs possesses some internal, unclonable physical disorder, and possess some form of challenge-response mechanism that exploits this disorder. A Weak PUF has got very few, fixed challenges, and in certain cases only one challenge per PUF instance. The challenge-response interface (or the challenge-response mechanism, respectively) of a Weak PUF may be be access-restricted. Adversaries cannot access to the Weak PUF's responses, even if they hold physical possession of the PUF-carrying hardware. Weak PUFs can be implemented either using special purpose integrated circuits designed to be sensitive to variation, or by using the intrinsic variation present in all existing circuits. SRAM PUFs are example of weak PUFs exploiting the inherent threshold variation of the cross-coupled inversors making up the SRAM cells.

A "strong" PUF derives a more complex challenge-response behavior from the physical disorder present in the PUF. A strong PUF comprises many elements (physical components) involved in the generation of a response, and there is a very large number of possible challenges that can be applied to the PUF. A strong PUF has the following features:
Strong PUFs have a very large number of possible challenges.
Unpredictability: Even if an adversary knows a large subset of CRPs, he cannot extrapolate or predict the other, yet unknown CRPs.
Unprotected challenge-response interface: strong PUF have generally a freely, publicly accessible challenge-response interface. Anyone holding physical possession of the PUF or the PUF-carrying hardware can apply arbitrary challenges to the Strong PUF and read out the corresponding responses.

It should be noted that a "weak PUF" (e.g., SRAM-PUF, butterfly PUF, etc) represents a collection of elements, which can be each addressed individually. The challenge of a weak PUF thus represents the address of the memory point, and the response is the contents of the memory point at powerup.

A "strong PUF" is also made up of several elements, which are nonetheless not meant to be accessed independently. Indeed, the strong PUF is unique via an aggregated behavior of its elements, such as the total delay difference.

The PUF 10 is based on an internal structure which is different depending on the type of PUF and which reacts to the challenges to produce a response. The internal structure of the PUF may comprise repeated patterns (referred to hereinafter as "PUF elements") each pattern including a set of physical components.

Figure 2:
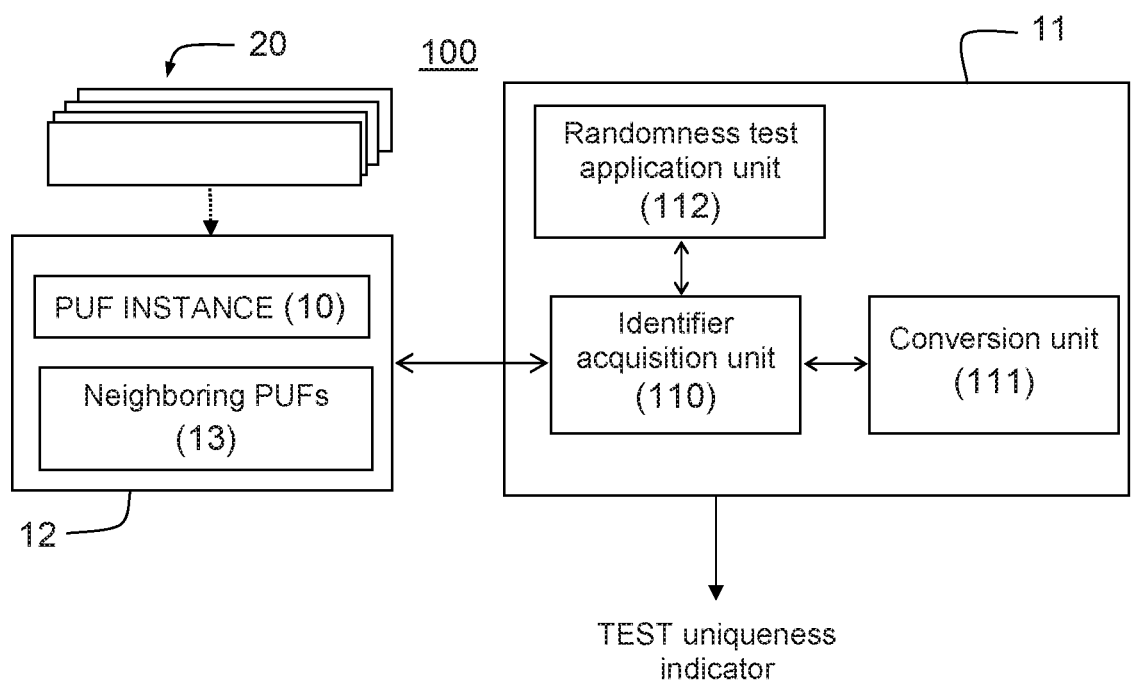
FIG. 2 is a block diagram of a testing system, according to certain embodiments.

FIG. 2 is a block diagram of the testing system 100 according to certain embodiments. As shown in FIG. 2, the testing device 11 may be arranged adjacent to the device 12 embedding the PUF. Alternatively, the testing device may be implemented in a distant server connected to the device 12 embedding the PUF instance through a computer network, the server being configured to receive requests for testing PUF instances from one or more client devices.

The internal structure of the PUF instance 10 to be tested may be a circuitry comprising a set of PUF elements that contribute to a PUF response to application of at least one bit of a challenge to the PUF. The PUF elements satisfy a predefined pattern (same pattern for all the PUF elements), each PUF element comprising a set of physical components defined by the pattern.

Depending on the architecture and the type of the PUF, the assembly of the PUF elements in the PUF instance may differ. For example:
- for a PUF of the type SRAM, butterfly, ring-oscillator (RO) PUFs, each PUF element is independent;
- for an Arbiter PUF (APUF), the PUF elements are chained by pairs, an element of each pair belonging to a different logic path;
- for a Loop-PUF (LPUF), the PUF elements are chained in a ring.

Each challenge applied to the PUF 10 comprises a set of bits (or "string of bits"). Each PUF element is controlled by at least one input bit represented by a bit of the challenge being applied to the PUF. The PUF elements of a PUF instance are configured to perform a same function in response to such inputs being applied to the PUF elements. In certain types of PUF such as an arbiter PUF, the number of PUF elements is equal to the number of bits comprised in the challenge (in other words, a bit position in the challenge is associated with a PUF element, the bit at this bit position being input to the PUF element as a control bit).

The PUF testing device 11 may comprise:
- an identifier acquisition unit 110 (also referred to as an "identifier acquisition unit") configured to acquire (or determining) identifiers of at least some of the PUF elements of the PUF instance 10, the identifiers of the PUF elements being determined from the output read at each PUF element;
- a randomness test application unit 112 (also referred to as "an identifier acquisition unit test application unit") configured to apply at least one statistical randomness test to a group of identifiers comprising at least some of the identifiers acquired from the PUF elements, which provides a test indicator. The "test indicator" will be referred to hereinafter as a "uniqueness indicator" although such indicator is both an indicator of the uniqueness and the randomness of the PUF.

In certain embodiments, a conversion unit 111 may be further used to render the identifiers acquired from the PUF elements of the PUF instance reliable.

Furthermore, in certain embodiments, the randomness test application unit 112 may further take into account other identifiers acquired from neighboring PUF instances 13 within the group of identifiers.

The uniqueness of the PUF instance may be assessed from said PUF uniqueness indicator.

Unexpectedly, the inventors have found out that it is possible to efficiently test the randomness and uniqueness properties of a PUF instance 10 belonging to a PUF batch 20 comprising a set of PUF instances by testing the PUF elements comprised in each PUF instance 10. The embodiments of the present invention exploits the fact that PUF elements are likely to be more correlated than two distinct PUF instances due to the spatial distance (inter-distance) introduced during the PUF manufacturing process.

Indeed, the PUF might not be unique due to "correlations" between PUF instances. Those correlations can be due to at least:
- an architectural bias, meaning that the PUF design is poorly unique/random after fabrication;
- a correlation in the transistor characteristic dispersion.

The first kind of correlation (due to architectural bias) generally exists whichever the fabrication place and time. The second kind of correlation (due to transistor characteristic dispersion) is reduced with space. Two neighboring elements are more correlated than two chips on the same wafer, which are themselves more correlated than two chips on two different wafers. Therefore, by considering a PUF instance 10 as a batch of "elementary 1-bit PUFs", it has been found out that the local measure of uniqueness and randomness as achieved by the invention reveals the architecture bias, if any, and a worst case estimation of the correlation due to small technological dispersion. It should be noted that even if the estimation of uniqueness and randomness within one PUF is a pessimistic estimation, it provides a conservative estimation that warranties the uniqueness and randomness of the PUF.

Figure 3:
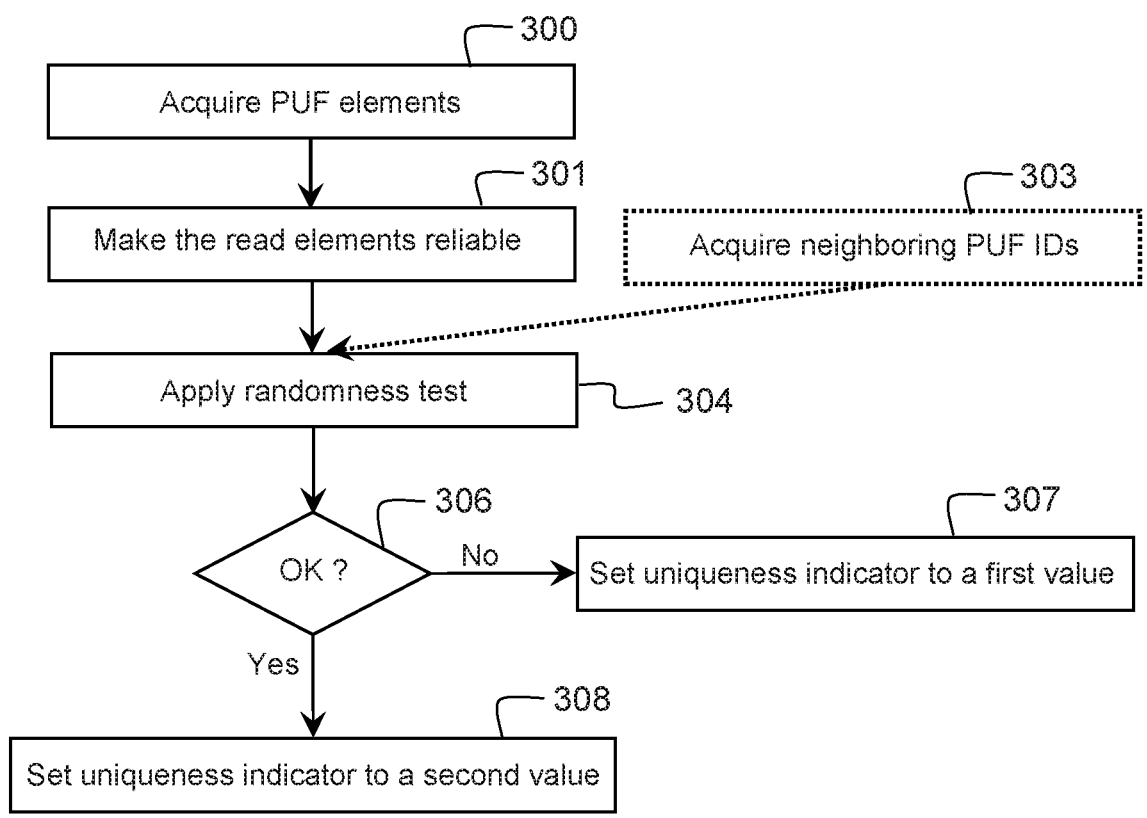
FIG. 3 is a flowchart depicting the steps of testing uniqueness and randomness of a PUF instance belonging to a PUF batch, according to certain embodiments.

FIG. 3 is a flowchart depicting the testing method implemented by the testing device 11. The testing method enables testing uniqueness and randomness of a PUF instance 10 belonging to a PUF batch 20, without a need to access to the other PUF instances of the batch.

According to embodiments of the invention, identifiers of the PUF elements of the PUF instance 10 may be determined from the output of each PUF element in response to the application of one or more bits of at least one challenge.

More specifically, in step 300, the identifiers of the PUF elements 100 of the PUF instance 10 may be determined from the elementary responses generated at each PUF element output in response to one or more challenges applied to the PUF instance 10. Step 300 may be implemented in different ways depending on the PUF type.

In step 301, the uniqueness of the PUF elements may be assessed by applying a statistical randomness test to a group of identifiers comprising the identifiers of PUF elements acquired in step 300.

In some embodiments the statistical randomness test may be chosen in a group consisting of an entropy test and a Maurer universal statistical test.

Such statistical randomness tests may be configured to detect a wide gamut of statistical defects within a distribution.

In one embodiment of the invention using the Maurer Universal test in step 301, the Maurer universal test may take as inputs three integer test parameters $\{L, Q, K\}$ and a N-bit sample $S^N = [s_1, \ldots, s_N]$ generated from the identifiers acquired in step 202. Values of L, Q, K may be chosen as described in U. M. Maurer, « A Universal Statistical Test for Random Bit Generators, "Journal of Cryptology. Vol. 5, No. 2, 1992, pp. 89-105: we can quote the paper". In some embodiments, the test parameters L, Q and K may be advantageously chosen as follows:

L may be selected between 6 and 16 inclusive;
Q may be greater than $10 \times 2^L$; and/or
K may be as large as possible, e.g. K may be equal to $1000 \times 2^L$ These values of L, Q and K can be scaled to match the available number of bits.

In step 305, a PUF uniqueness indicator may be returned as a result of the statistical test applied in step 304. The PUF uniqueness indicator may be a bit value which may take a first value or a second value. For example, the PUF uniqueness indicator may be assigned a first value (for example "0") in step 307, if the test of block 306 failed, i.e. at least one identifier among the identifiers acquired from the PUF elements is redundant (redundancy detected). Otherwise, the PUF uniqueness indicator may be assigned a second value (for example "1") in step 308, if the test of block 306 succeeded, i.e. no redundancy has been detected among the identifiers acquired from the PUF elements (the identifiers acquired in step 300 are thus considered as unique within the considered group of identifiers).

As the PUF elements are likely to be more correlated than two distinct PUF instances of the PUF batch due to the spatial distance (inter-distance) introduced during the PUF manufacturing process, if the PUF uniqueness indicator indicates that a redundancy has been detected within the PUF element identifiers comprised in the group of PUF elements (PUF uniqueness indicator assigned to the first value), the worst situation is detected as regards the entropy of PUF, which means that the PUF is dubious.

The testing method may trigger an action in response to the PUF uniqueness indicator being assigned the first value (redundancy detected). Such action may be chosen in a group consisting of a revocation of said PUF, a disablement of said PUF, an emission of a notification, or an emission of an alert message. The device 12 carrying the PUF may be thus able to report to an administrator system that a security event occurs. Such information may be used by the administrator system or a network operator to decide which "counter-action" is to be taken. For instance, the devices in the vicinity of the compromised PUF can be disabled or have their security awareness level increased.

In some embodiments, the testing method may comprise a further step 301 of detecting errors generated during the step of acquiring the identifiers of said PUF elements and correcting the errors. This ensures the reliability of the acquired identifiers. Reliability can be assessed by repeatedly measuring identifiers under the same challenge, and checking that they are the same most of the time.

In some embodiments, the testing method may further comprise a step 303 of acquiring the identifiers of the PUF elements of neighboring PUFs, that is PUFs which are located in the vicinity of said PUF in the same device or a neighboring device. Such PUF element identifiers are then added to the group of PUF identifiers on which the statistical randomness test is applied in step 304.

Step 300 of acquiring the identifiers of the PUF elements may be implemented in different ways depending on the type of the PUF.

In certain embodiments, in order to determine the identifier of each PUF element, auxiliary components (such as hardware components) may be used in the PUF instance to determine the elementary response of each PU element in response to a challenge applied to the PUF instance.

In certain embodiments, the auxiliary components may be reading components for reading the output (elementary response) of each PUF element in response to an applied challenge. Step 300 of acquiring the identifiers of the elements of the PUF instance 10 may then be implemented by reading the identifier of each PUF element of the PUF according to a given access mode (also referred as reading mode). The reading mode may be selected in a group consisting of a sequential mode for sequentially reading the identifiers and a parallel access mode for reading in parallel the identifiers.

For example, if the PUF is an APUF, the auxiliary components used to read the PUF outputs may be arbiters configured to bypass all pairs of delay element.

In certain types of PUFs, such as some weak PUFs (such as for example a SRAM, butterfly, and RO PUFs), the auxiliary components may be read components originally implemented in the PUF to read the outputs of the PUF elements in order to form the PUF response to the challenge. In other types of PUFs, such auxiliary components may be inserted within the PUF instance at the time of manufacturing the PUF instance, even if such read elements are not required for the operation of the PUF as such. The auxiliary components will be used to read the elementary response of each PUF element in order to determine the identifier of the PUF element from the read output.

Alternatively, in certain embodiments, instead of using auxiliary components to read the output of the PUF elements in response to a challenge, a temporal access may be used for requesting the PUF with a first challenge, the "digital response" being equal to the comparison between the first challenge and a second challenge at a distance 1 of the first challenge. Such temporal access may be available in some strong PUFs such as a loop-PUF (LPUF) for example.

Figure 4:
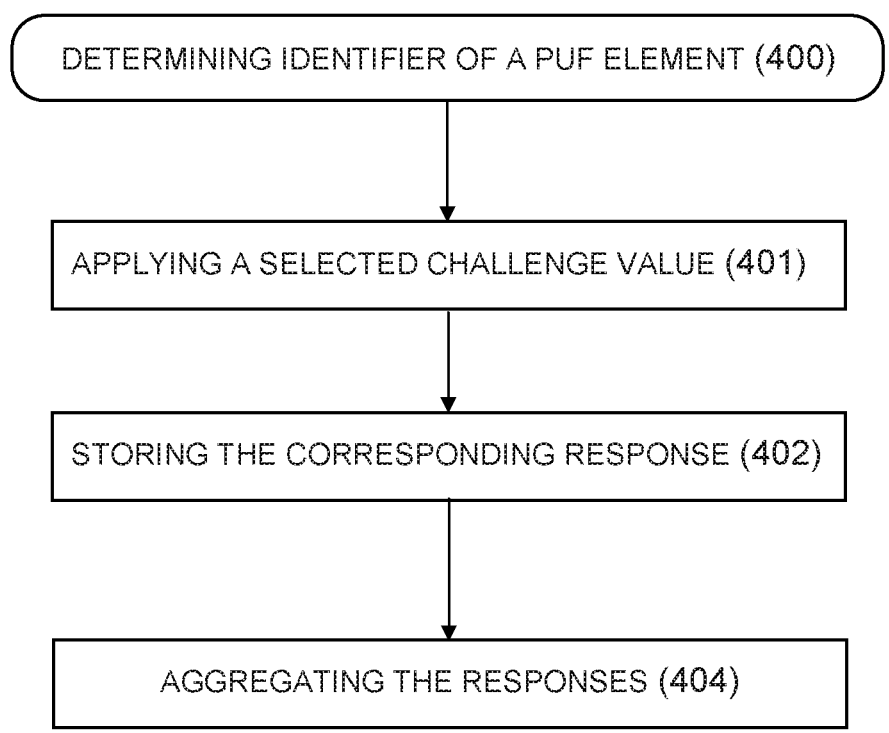
FIG. 4 is a flowchart illustrating the step of acquiring the PUF elements of a PUF, according to certain embodiments.

FIG. 4 is a flowchart illustrating the step of acquiring the PUF elements of the PUF (step 301), using auxiliary components for determining the PUF element identifiers using temporal access, according to certain embodiments.

The step of acquiring the identifiers of the PUF elements of a strong PUF 10 (step 400) may comprise, for each PUF element:
  iteratively applying a value to said challenge (401) corresponding to the bit controlling the PUF element and reading the response at the output of the PUF element (402), which provide a bit response;
  determining an identifier for the PUF element (404) from at least some of the one-bit responses iteratively output by the PUF elements for the set of challenge values iteratively applied.

The number of iterations may be predefined or selected. The number of iterations may depend on the entropy of the PUF element identifier. Indeed, the size of the identifier (in bits) bounds its entropy. For example, for cryptographic applications, a size of 128 bits (symmetric cryptography) or 256 bits (asymmetric cryptography on elliptic curves) may be typically required.

In certain embodiments, the challenge may comprise a set of bits while the bit response at the output of each PUF element is a one-bit response.

In certain embodiments, the identifier of a given PUF element may be determined in step 404 by aggregating the bit responses iteratively read at the PUF element output, as a result of the different challenges applied. In applications of the invention where the bit response read at the output of each PUF element is a one-bit response, the number of bits forming the identifier may be equal to the number of iterations.

Accordingly, an identifier for each PUF element may be generated from the bit responses obtained at the output of each PUF element by applying iteratively a number of challenge values to the PUF.

In certain embodiments, the bit responses of one or more PUF elements may be determined in parallel for each applied challenge to generate in parallel the identifiers of the PUF elements. Alternatively, the bit responses of one or more PUF elements may be determined sequentially.

In certain applications of the invention, the bit responses of the PUF elements comprised in the PUF instance 10 may be stored in a same data structure indexed by a first index representing the index of the PUF element and a second index representing the index of the challenge applied. Alternatively, a different data structure may be used to store the bit responses of each PUF element for the different challenges applied to the PUF instance 10.

In certain embodiments, each PUF instance 10 may be further controlled by a test mode input which may receive a first value to activate the test of the PUF and a second value to activate the functional operation of the PUF. The test mode input may be shared by each PUF element of the PUF.

Figure 5:
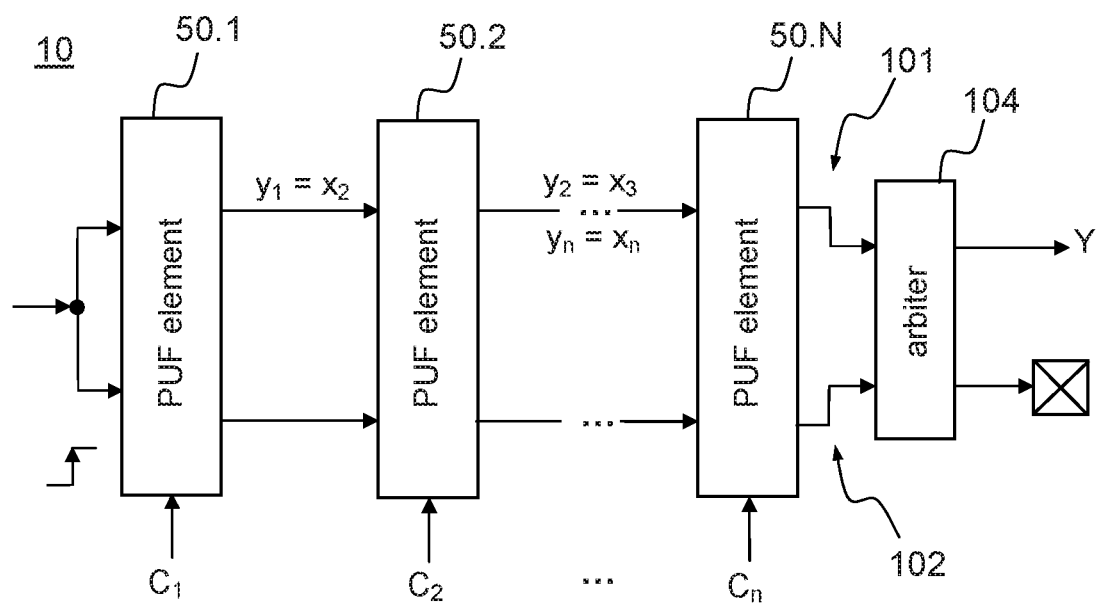
FIG. 5 illustrates an exemplary application of the invention to an arbiter PUF, according to certain embodiments.

FIG. 5 illustrates an exemplary application of the invention to an arbiter PUF 10, according to certain embodiments.

An Arbiter PUF 10 extracts the device-specific variation as delay differential between two logic paths 101 and 102. The arbiter PUF 10 comprises chain of PUF elements 50-$j$ which are delay elements defining the two logic paths and a main arbiter unit 104 (also referred to hereinafter as "arbiter" or "main arbiter"). The arbiter 104 may be implemented for example as a latch or a flip-flop having a D port and a clock port.

The arbiter PUF 10 has a multiple bit input on which is applied one or more challenges $C_1 \ldots C_i \ldots C_n$ and compute a one-bit output Y based on the relative delay difference between the two paths 101 and 102. The delays of the two logic paths 101 and 102 are affected by the intrinsic device-specific variation, and therefore the Arbiter PUF 10 is expected to output unique identifiers to the device 12 on which it is implemented. The input bits determine the delay of the paths by controlling the PUF elements 50-$j$, each PUF element comprising a pair of multiplexer-based components.

Stimuli are simultaneously input to the upper and lower logic path 101 and 102 and the challenge is input as a selection signal to the arbiter PUF 10. The stimuli travel through a set of PUF elements 50-$j$ in the paths 101, 102 according to the input challenge defined by the sequence of bits $C_1 \ldots C_i \ldots C_n$, the PUF elements 50 having the same pattern. Each PUF element 50-$j$ of the arbiter-PUF is controlled by a bit C of the challenge applied to the PUF 10.

Figure 6:
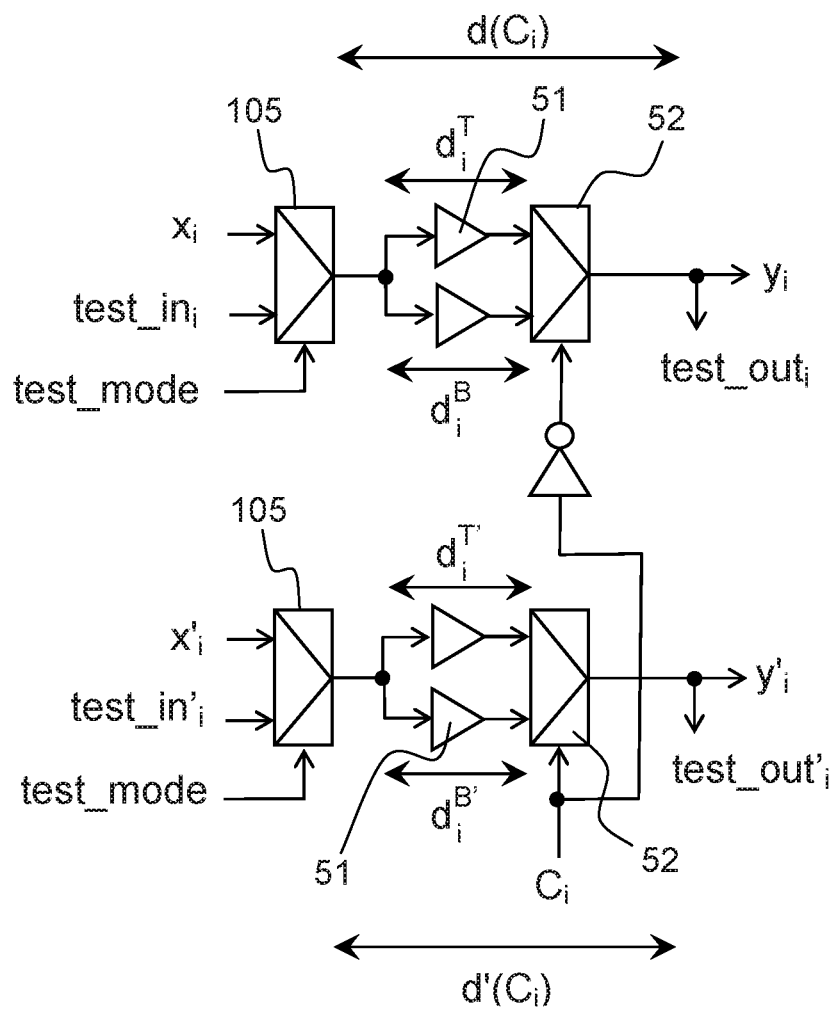
FIG. 6 represents a PUF element of an arbiter-PUF, according to certain embodiments.

FIG. 6 represents a PUF element of an arbiter-PUF according to certain embodiments. As shown, each PUF elements $C_i$ comprise an upper component $d(C_i)$ arranged in the upper path 101 and a lower $d(C'_i)$ arranged in the lower path 102, the upper and lower components being chained by pairs:
  The upper component $d(C_i)$ receives an input $x_i$ and delivers an output $y_i$;
  The lower component $d(C'_i)$ receives an input $x'_i$ and delivers an output $y'_i$.

The upper component $d(C_i)$ and the lower component $d'(C_i)$ of each PUF element 50-$j$ may comprise switching unit 52 such as multiplexers or selectors controlled by the same input $C_i$ corresponding to the i-th bit of the challenge. The following description will be made with reference to switching units implemented as multiplexers for illustrative purpose only. Accordingly, for each i-th PUF element 50-$j$, the outputs $(y_i, y'_i)$ are connected to inputs $(x_i, x'_i)$. In certain embodiments, the upper component $d(C_i)$ and the lower component $d'(C_i)$ of each PUF element 50-$j$ may further comprise buffers 51. Each PUF element works a switching unit controlled by the input $C_i$. If the input control bit $C_i$ is zero, one of the inputs of the multiplexer 52 of each component $d(C_i)$ or $d'(C_i)$, such as the 0-input, may be selected: the two delay signals then pass through the zero entry. Otherwise, the other input of the multiplexers 52 is selected such that the top and bottom signals are switched. The PUF arbiter circuitry thus creates a pair of delay paths 101 and 102 for each challenge input $C=C_1 \ldots C_i \ldots C_n$. To evaluate the output Y in response to a particular challenge, a rising signal is given to both paths at the same time, the signals then racing through the two delay paths. Accordingly, the primary inputs $(x_1, x'_1)$ both receives a 0 to 1 edge. This rising edge then propagates through buffers 51 with identical delay $d_i^T$ and $d_i^B$ for the upper component $d(C_i)$ (similarly identical delays $d'^T_i$ and $d'^B_i$ for the lower component $d(C'_i)$), and multiplexers 52.

The arbiter unit 104 (comprising for example a latch) determines which signal is faster at the end of the path. If the fastest signal between the output of the upper component $d(C)$ and the output of the lower component $d(C'_i)$ is $y_n$, the arbiter unit 104 (which receives the signals $y'_n$ and $y_n$ as inputs) may deliver 1: the PUF 10 then outputs a response equal to 1. Otherwise, if $y'_n$ is the fastest signal, the arbiter unit 104 may deliver a response equal to 0: the PUF then outputs a response 0.

As shown in FIG. 6, to generate an identifier for each PUF element 50-$j$, the PUF-arbiter 10 may comprise at least one auxiliary component 105 arranged upstream each component $d(C_i)$ and $d(C'_i)$. In some embodiment, the auxiliary component 105 may be configured to select one input among the main input $x_i$ of the component (respectively $x'_i$ for the lower component) and an auxiliary input test_in$_i$ (respectively test_in'$_i$ for the lower component) depending on a control input test_mode. An auxiliary output test_out (respectively test_out'$_i$ for the lower component) may be connected at the output of each paired-component $d(C_i)$ and $d(C'_i)$ for collected the one-bit response obtained in the test mode and bypassing the other PUF elements 50-$j$ in such test mode.

The auxiliary components 105 arranged in the two paired components $d(C_i)$ and $d(C'_i)$ of each PUF element 50-$j$ of the chain are accordingly configured to enable injection of the rising edge in the auxiliary input test_in$_i$ at the upper component $d(C_i)$, and in the auxiliary input test_in'$_i$ at the lower component $d(C'_i)$ of the PUF-element 50-$j$ depending on the value of the test mode. The test mode signal test_mode may be shared by the paired components $d(C_i)$ and $d(C'_i)$ and configured to activate a mode between a test mode in which the PUF is to be tested and a functional PUF mode in which the PUF instance may operate conventionally. Accordingly, if the value of the test mode signal is the value that activates the test mode, the auxiliary input test_in$_i$ (respectively test_in'$_i$) is input to the auxiliary component 105 of each paired component $d(C_i)$ (respectively $d(C'_i)$) instead of the main input $x_i$ (respectively $x'_i$ for the lower component).

Alternatively, if the value of the test mode signal activates the functional mode of the PUF, the main input $x_i$ (respectively $x'_i$) is input to the auxiliary component 105 of each paired component $d(C_i)$ (respectively $d(C'_i)$). The PUF can then operate according its conventional operation mode.

Figure 7:
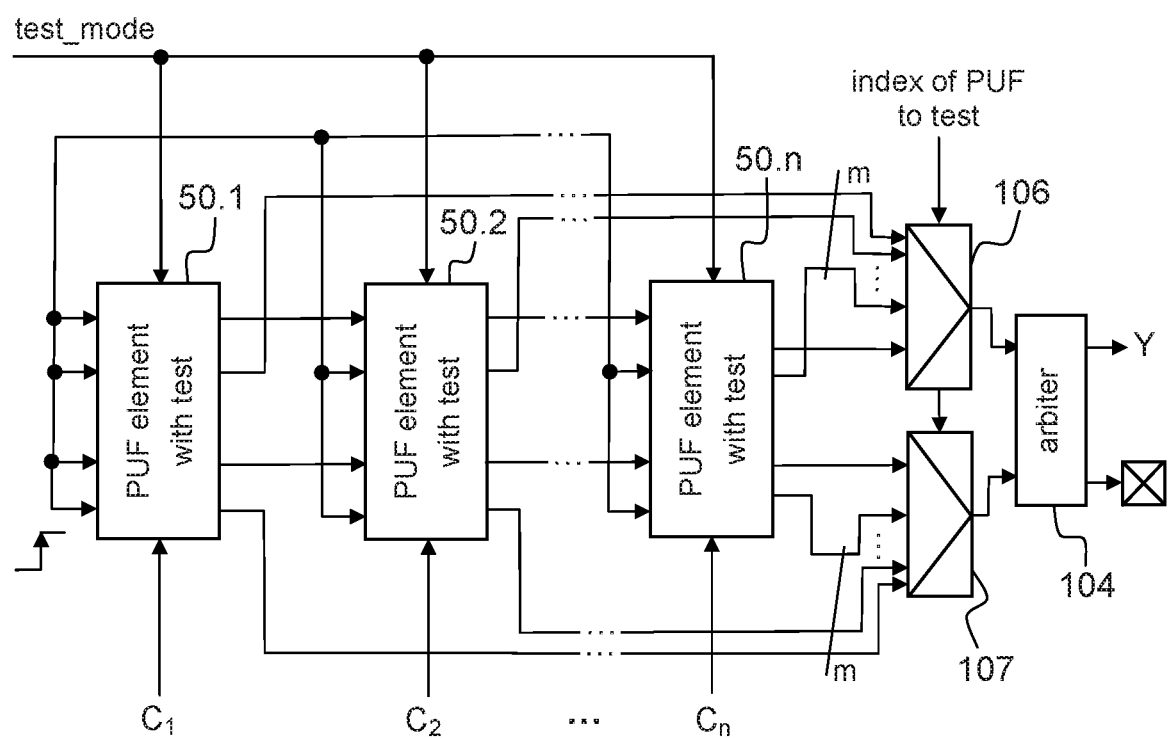
FIG. 7 represents an arbiter PUF, according to one embodiment.
Figure 8:
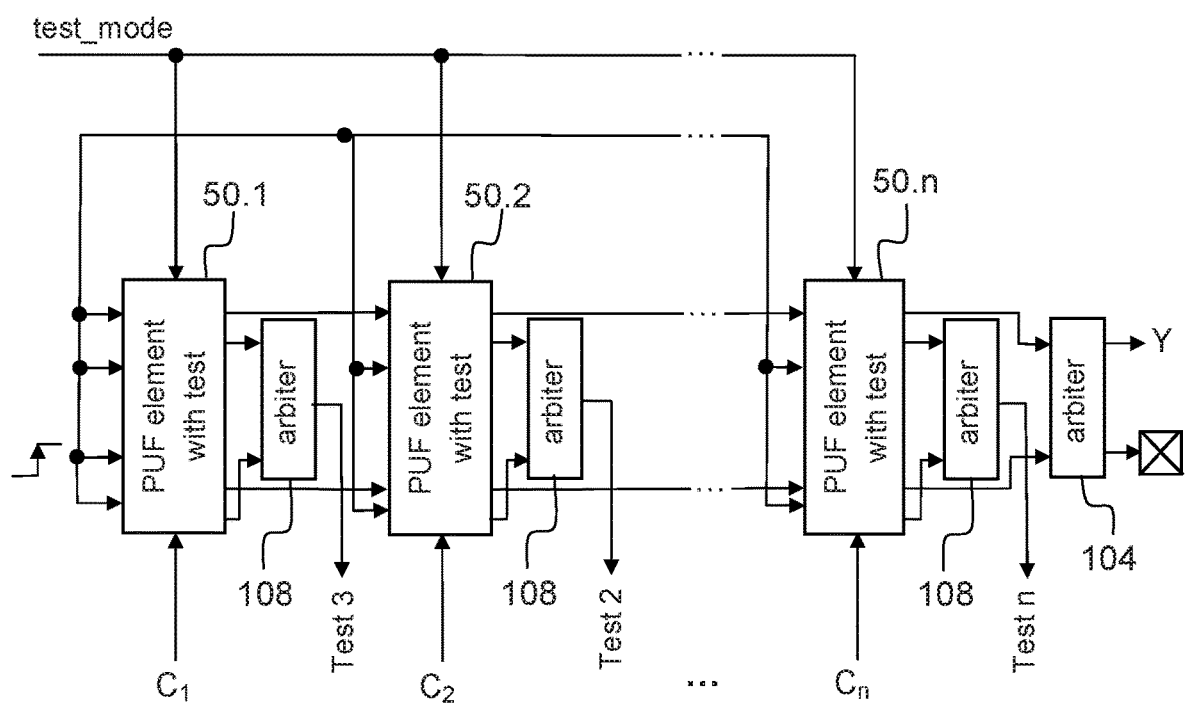
FIG. 8 represents an arbiter PUF, according to another embodiment.

As shown in FIGS. 7 and 8, the auxiliary components of the PUF instance 10 can further comprise additional arbitrating components for arbitrating between the auxiliary output test_out$_i$ of the upper component $d(C_i)$ and the auxiliary output test_out'$_i$ of the lower component.

In the embodiment of FIG. 7, the arbitrating components may comprise the main arbiter 104 and the following auxiliary components:

- an upper auxiliary selector 106 which may be implemented for example as a multiplexer comprising a set of inputs comprising the auxiliary outputs test_out$_i$ of the upper components at least some of the PUF elements 50-$j$ of the upper path 101 of the PUF and the output of the main output y$_n$ of the upper component of the last PUF element in the chain (n-th) PUF element.
- a lower auxiliary selector 107 which may be implemented as a multiplexer comprising a set of inputs including the auxiliary outputs test_out'$_i$ of at least some of the PUF elements 50-$j$ of the lower path 102 of the PUF and the main output y'$_n$ of the lower component of the last PUF element in the chain (n-th) PUF element.

Each auxiliary selector 106 or 107 may be controlled by an index input shared by both auxiliary selectors 106 and 107 and representing the index of the PUF element to be tested. If an index i is selected by the index input in the test mode (the test_mode input has a value that activate the test mode of the PUF), the auxiliary selectors 106 and 107 select respectively the auxiliary outputs test_out$_i$ and test_out'$_i$ of the paired components of the i-th PUF element. The arbiter 104 may then determine a one-bit response for the i-th PUF element by determining which signal is faster between the signal output at test_out$_i$ and the signal output at test_out'$_i$. If the test mode input test_mode has a value that activates the functional mode of the PUF, the arbiter operates as conventionally using the main outputs y$_n$ and y'$_n$ of the upper and lower components of the last PUF element in the chain to provide the challenge response of the PUF.

As shown in FIG. 7, the auxiliary components of the PUF instance 10 can further comprise elementary arbiters 106 for arbitrating between the auxiliary output test_out$_i$ of the upper component d(C$_i$) and the auxiliary output test_out'$_i$ of the lower component. The elementary arbiter 106 associated with each PUF element may be configured to determine determines which signal is faster between the signal output at test_out$_i$ and the signal output at test_out'$_i$. Each elementary arbiter may be implemented for example as a latch having a latch data input D and a clock C data input.

The operation of the PUF-instance in the test mode may be implemented according to the testing method of FIG. 4 by iteratively applying a value to the challenge C=C$_1$ . . . C$_i$ . . . C$_n$ (401), each bit value C$_i$ controlling the i-th PUF-element.

For each applied challenge, a one bit response is read at the output of the elementary arbiter 106 associated with the i-th PUF-element 50-$j$ (step 402 of FIG. 4). More specifically, if the fastest signal between the auxiliary output test_out$_i$ of the upper component d(C$_i$) and the auxiliary output test_out'$_i$ of the lower component d(C'$_i$) is test_out$_i$ (auxiliary output of the upper component d(C$_i$)), the elementary arbiter 106 may deliver 1 as the one-bit response. Otherwise, if the fastest signal between test_out$_i$ and test_out'$_i$ is test_out'$_i$ (auxiliary output of the lower component d(C'$_i$)), the elementary arbiter 106 may deliver 0 as the one-bit response.

Other challenge values may be applied iteratively to the i-th PUF element, and at each iteration the one bit response may be read. The one-bit responses obtained for the different challenge values applied to the PUF in the test mode may be stored in a data structure. The one-bit responses obtained for the i-th PUF element may be aggregated or combined when a predefined or selected number of challenges have been applied to generate an identifier of the i-th PUF element (step 404 of FIG. 4).

In embodiments where the testing device 11 of the testing system is configured to acquire the identifiers of the PUF elements of neighboring PUF instances of the same PUF batch 20 that are implemented on the same device 12, the PUF instance being tested may acquire identifiers of PUF elements of the neighboring PUF instances using an exchange protocol such as for example the Diffie-Hellman protocol. The testing device may then acquire the identifiers to constitute the group of identifier to be tested using the randomness test from the PUF instance directly (step 304 of FIG. 3).

Alternatively, the neighboring PUF may transmit the identifiers of their PUF elements directly to the testing device 11.

In embodiments where the testing device 11 is implemented in the form of a server connected to each PUF instance via a network 60 as depicted in FIG. 8, the testing device may be configured to acquire identifiers of PUF elements of other PUF instances of the same batch 20 whether implemented in the same device 12 or in another device.

FIG. 8 shows an exemplary implementation of the testing system 100 in which the testing device 11 is configured to acquire the identifiers of the PUF elements of additional PUF instances of the same PUF batch 20.

The testing device 11 may be implemented in the form of a server connected to each PUF instance via a network 60 as depicted in FIG. 8, the PUF instances may also comprise other PUF instances of the same batch 20 whether implemented in the same device 12 or in another device. In such embodiments, the server may include a user interface for entering request for testing a particular PUF batch 20, the batch being identified by a batch number. The testing device may then acquire the identifiers of PUF elements of the PUF instances corresponding to the batch number which are connected thereto The network may be any suitable network such as the Internet, a local area network (LAN), a wide area network (WAN) and/or other such types of communication networks. Accordingly, if each PUF instance returns K identifiers and N PUF instances are used to form the group of tested identifiers, the number of identifiers of the group of identifiers to which the randomness test is applied (step 304 of FIG. 3) may be augmented to kxN.

The identifiers acquired from the other PUF instances may be added in the group of identifiers to which the randomness test is applied (as described with reference to step 304 of FIG. 3). Alternatively, the identifiers acquired from each PUF instance may be tested separately by the randomness test application unit (i.e the randomness test is applied to groups of identifiers, the identifier of each group corresponding to one PUF instance).

Embodiments of the present invention enable testing the randomness/unpredictability property (property that PUFs responses are not predictable) and the uniqueness property (property that instances of PUFs differ) of a PUF batch by testing the PUF elements that are comprised in at least a single PUF instance of the PUF batch or in a limited number of PUF instances. The testing method invention may be implemented online, i.e. in situations where the PUF instances are implemented in a device by switching the operation of the PUF into a test mode.

Embodiments of the present invention may be carried out in the field, on the device embedding the PUF (integrated circuit, final product, etc.). The testing system 100 may be implemented without requiring external connections that create "backdoor".

The testing method may be implemented during the life cycle of a PUF instance, such as for examples:
  at every boot of the PUF,
  before each usage of the PUF, or
  sporadically or according to a predefined frequency to check the integrity of the PUF.

Figure 9:
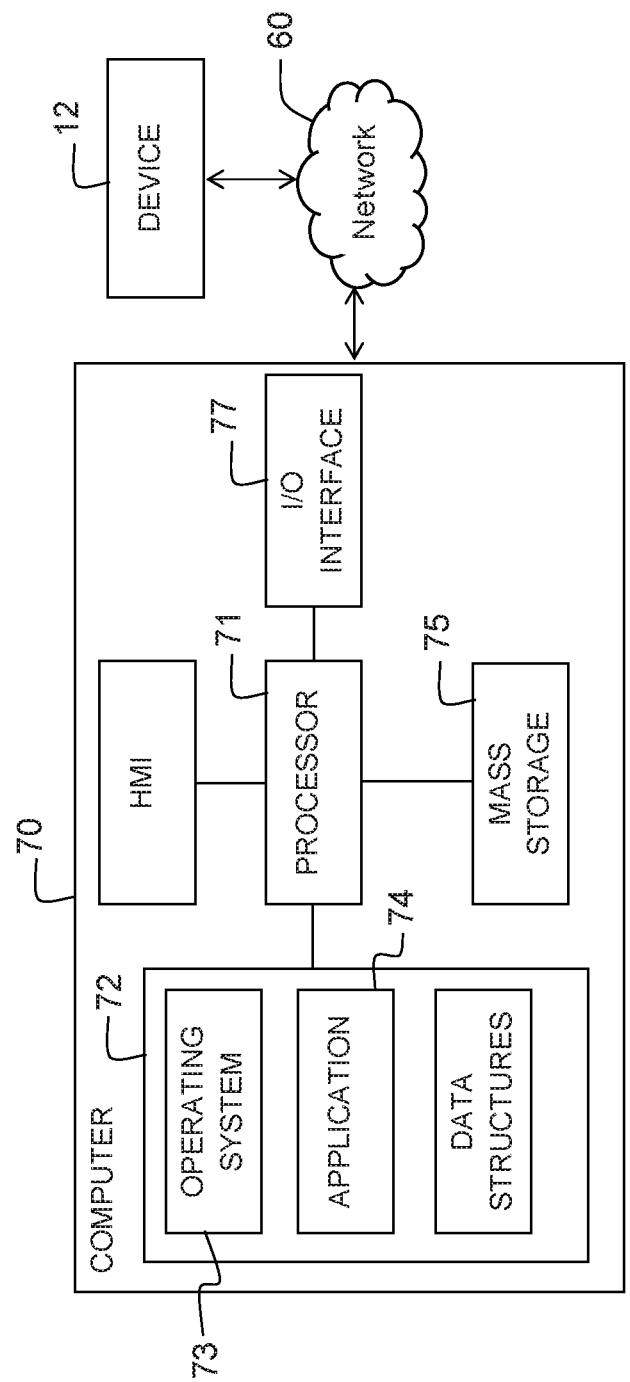
FIG. 9 represents an exemplary implementation of the testing system.

Referring now to FIG. 9, the testing device 11 may be implemented on one or more computing devices or systems, referred to collectively as a computer such as computer 70. The computer 70 may include a processor 71, a memory 72, a mass storage memory device 75, an input/output (I/O) interface 77, and a Human Machine Interface (HMI) 78. The computer 70 may also be connected to one or more devices 11 embedding at least one PUF instance and be operatively coupled to one or more external resources via the network 60 and/or I/O interface 77. External resources may include, but are not limited to, servers, databases, mass storage devices, peripheral devices, cloud-based network services, or any other suitable computing resource that may used by the computer 70.

The processor 71 may include one or more devices that manipulate signals (analog or digital) based on operational instructions that are stored in the memory 72, such as microprocessors, micro-controllers, digital signal processors, microcomputers, central processing units, etc. Memory 72 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. Processor 71 may execute instructions directly or under the control of an operating system 73 that resides in memory 72. The operating system 73 may manage computing resources so that computer program code embodied as one or more computer software applications, such as an application 74 residing in memory 72, may have instructions executed by the processor 71. One or more data structures may also reside in memory 72, and may be used by the processor 71, operating system 73, and/or application 74 to store or manipulate data. The data structures may include data structures for storing identifiers of the PUF elements acquired from a PUF instance 10 of a given PUF batch 20.

The I/O interface 77 may provide a machine interface that operatively couples the processor 71 to other devices and systems, such as the network 60 and/or external resource 42. The HMI 78 may be operatively coupled to the processor 32 of computer 30 in a known manner to allow a user of the computer 30 to interact directly with the computer 30. The HMI 78 may include any suitable audio and visual indicators capable of providing information to the user (video and/or alphanumeric displays, a touch screen, a speaker, etc.) and input devices and controls capable of accepting commands or input from the user and transmitting the entered input to the processor 70.

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

More generally, the testing system and method described herein may be implemented by various means in hardware, software, or a combination thereof.

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. In particular, the invention is not limited to a particular type of PUF. The invention is not limited either to a particular number of PUF elements in the PUF instance 10 being tested. Further, the invention is not limited to Maurer or entropy test as randomness tests to be applied to test the PUF element identifiers (step 304 of FIG. 3). Other type of randomness statistical tests may be applied alternatively.

The invention claimed is:

1. A method for testing the uniqueness of a Physically Unclonable Function (PUF) batch comprising a set of PUF instances, the method being implemented in a device, wherein the method comprises:
  testing the uniqueness of the PUF batch by testing a PUF instance belonging to said PUF batch, said PUF instance being configured to receive at least one challenge comprising a set of bits, and to produce a set of responses, each response comprising at least one bit and corresponding to a challenge, said PUF instance comprising a circuitry including a set of PUF elements corresponding to repeated patterns, each pattern including a set of physical components, each PUF element being controlled by at least one input bit corresponding to at least one bit of said the challenge,
  wherein the step of testing the PUF instance comprises:
    applying at least one bit of the challenge to the PUF instance;
    determining identifiers for at least some of the PUF elements, the identifier of each PUF element being determined from the response output by said each PUF element in response to said at least one bit of the challenge, the response output by said each PUF element being read using auxiliary components arranged to read said response;
    applying a statistical randomness test to a group of identifiers comprising at least some of the identifiers determined for said PUF elements, which provides a test indicator, the test indicator having a first value if the test failed and a second value if the test succeeded;
  wherein the test of the uniqueness of the PUF batch being positive if the test indicator has the second value.

2. The method of claim 1, wherein said step of determining the identifiers of said PUF elements comprises reading the output of said at least some PUF elements, according to a reading protocol.

3. The method of claim 2, wherein said reading protocol is chosen in a group consisting of a sequential reading protocol and a parallel reading protocol.

4. The method of claim 2, wherein said step of determining the identifier of each PUF element comprises:

iteratively applying a set of challenges and reading the response output by said each PUF element in response to each challenge;

determining the identifier of said PUF identifier from said responses.

5. The method of claim 4, wherein the response output by said each PUF element comprises at least one bit, and said determining the identifier of said PUF identifier from said responses comprises aggregating at least some of the responses read for said set of challenges.

6. The method of claim 5, wherein it further comprises storing the responses read at the output of each PUF element in a data structure.

7. The method of claim 2, wherein said PUF is an arbiter-PUF comprising a set of PUF elements, each PUF element being a delay element comprising paired components, each paired component comprising at least one switching unit having a main input for receiving a signal, the paired components sharing a control input receiving the at least one bit of the challenge associated with said each PUF element, the paired components of the arbiter-PUF defining two logic paths in response to a challenge, the PUF further comprising a main arbiter unit at the end of the logic paths for comparing the analog timing difference between the two logic paths and producing a digital output dependent upon the timing differences, wherein said PUF further comprises auxiliary components for generating a bit value by determining which signal is faster between the two signals output at the paired components of each PUF element, the response at the output of the PUF element being equal to said bit value.

8. The method of claim 7, wherein said auxiliary components further comprise at least one selector configured to select the outputs of the paired components of a chosen PUF element and transmit said outputs to the main arbiter unit in a test mode.

9. The method of claim 8, wherein said at least one selector is controlled by an index bit, said index bit having a value representing the index of said chosen PUF element.

10. The method of claim 9, wherein said auxiliary components further comprise a set of elementary arbitrating units, each elementary arbitrating unit being arranged at the output of a PUF element and being configured to receive the outputs of the paired components of said PUF element in a test mode and generate said bit value.

11. The method of claim 1, further comprising detecting errors generated during the acquiring the identifiers of said PUF elements and correcting the errors.

12. The method of claim 1, wherein the method further comprises determining the identifiers of neighboring PUF elements of one or more PUF instances of said PUF batch located in the vicinity of said PUF in the device, said group of PUF further comprising the identifiers of said neighboring PUF elements.

13. The method of claim 12, wherein the identifiers of neighboring PUF elements are transmitted to the PUF instance according to a Diffie-Hellman protocol.

14. The method of claim 13, wherein said at least one statistical randomness test is chosen in a group consisting of an entropy test and a Maurer test.

15. The method of claim 14, wherein the method further comprising a step of triggering an action in response to the test indicator being assigned said first value.

16. The method of claim 15, wherein said action is chosen in a group consisting of a revocation of said PUF, a disablement of said PUF, an emission of a notification, or an emission of an alert message.

17. A computer program product stored in a non-transitory computer storage medium for testing a Physically Unclonable Function (PUF) batch comprising a set of PUF instances, the computer program product comprises computing instructions for:

testing the uniqueness of the PUF batch by testing a PUF instance belonging to the PUF batch, said PUF instance being configured to receive at least one challenge comprising a set of bits, and to produce a set of responses, each response comprising at least one bit and corresponding to a challenge, said PUF instance comprising a circuitry including a set of PUF elements corresponding to repeated patterns, each pattern including a set of physical components, each PUF element being controlled by at least one input bit corresponding to at least one bit of the challenge, wherein testing the PUF instance comprises:

applying at least one bit of the challenge to a PUF instance;

determining identifiers for at least some of the PUF elements, the identifier of each PUF element being determined from the response output by said each PUF element in response to said at least one bit of the challenge, the response output by said each PUF element being read using auxiliary components arranged to read said response;

applying a statistical randomness test to a group of identifiers comprising at least some of the identifiers determined for said PUF elements, which provides a test indicator, the test indicator having a first value if the test failed and a second value if the test succeeded; and wherein the test of the uniqueness of the PUF batch being positive if the test indicator has the second value.

18. An apparatus comprising:

one or more microprocessors;

wherein the one or more microprocessors being configured for testing the uniqueness of a Physically Unclonable Function (PUF) batch comprising a set of PUF instances by testing a PUF instance belonging to the PUF batch, said PUF instance being configured to receive at least one challenge comprising a set of bits, and to produce a set of responses, each response comprising at least one bit and corresponding to a challenge, said PUF instance comprising a circuitry including a set of PUF elements corresponding to repeated patterns, each pattern including a set of physical components, each PUF element being controlled by at least one input bit corresponding to at least one bit of the challenge, wherein testing the PUF instance comprises:

apply at least one bit of the challenge to the PUF instance;

determine identifiers for at least some of the PUF elements, the identifier of each PUF element being determined from the response output by said each PUF element in response to said at least one bit of the challenge, the response output by said each PUF element being read using auxiliary components arranged to read said response; and apply a statistical randomness test to a group of identifiers comprising at least some of the identifiers determined for said PUF elements, which provides a test indicator, the test indicator having a first value if the test failed and a second value if the test succeeded;

wherein the test of the uniqueness of the PUF batch being positive if the test indicator has the second value.

* * * * *

UNITED STATES PATENT AND TRADEMARK OFFICE
CERTIFICATE OF CORRECTION

PATENT NO. : 10,630,492 B2
APPLICATION NO. : 15/480729
DATED : April 21, 2020
INVENTOR(S) : Sylvain Guilley, Jean-Luc Danger and Philippe Nguyen Page 1 of 1

It is certified that error appears in the above-identified patent and that said Letters Patent is hereby corrected as shown below:

In the Claims

In Claim 1, Column 18, Line 40 delete "one bit of said the challenge" and insert --one bit of the challenge--.

Signed and Sealed this
First Day of September, 2020

Andrei Iancu
*Director of the United States Patent and Trademark Office*